United States Patent [19]

Oliphant et al.

[11] Patent Number: 5,062,281

[45] Date of Patent: Nov. 5, 1991

[54] AIR CONDITIONING DEVICE

[75] Inventors: Sameul C. Oliphant, 13217 Green Valley Dr., Oklahoma City, Okla. 73120; David E. Gormley, Pocola, Okla.

[73] Assignee: Samuel C. Oliphant, Oklahoma City, Okla.

[21] Appl. No.: 638,270

[22] Filed: Jan. 7, 1991

[51] Int. Cl.[5] .............................................. F25D 3/08
[52] U.S. Cl. ..................................... 62/457.1; 62/529; 62/425; 62/406; 62/457.3
[58] Field of Search ....................... 62/371, 425, 457.1, 62/457.6, 457.3, 457.4, 457.8, 529, 406, 244; 237/78 R

[56] References Cited

U.S. PATENT DOCUMENTS 1,922,790 8/1933 Alger ..................................... 62/425
2,802,347 8/1957 Marcus .................................. 62/244

Primary Examiner—Albert J. Makay
Assistant Examiner—John Sollecito
Attorney, Agent, or Firm—Dunlap, Codding, Peterson & Lee

[57] ABSTRACT

A air conditioning device adapted to be used with a cup comprising a lid with a blower assembly means connected to the lid. The lid is removably connectable to an upper end of the cup and the lid has an air entry opening and an air exit opening. The blower means blows air into the air entry opening and the air passes into the cup space and over a substance in the cup space to provide an air exit stream. The air exit stream passes from the cup space through the air exit opening for passing a cool air exit stream from the lid. When the substance is a cool substance, the air exit stream is cool and, when the substance is a hot substance, the air exit stream is hot.

26 Claims, 3 Drawing Sheets

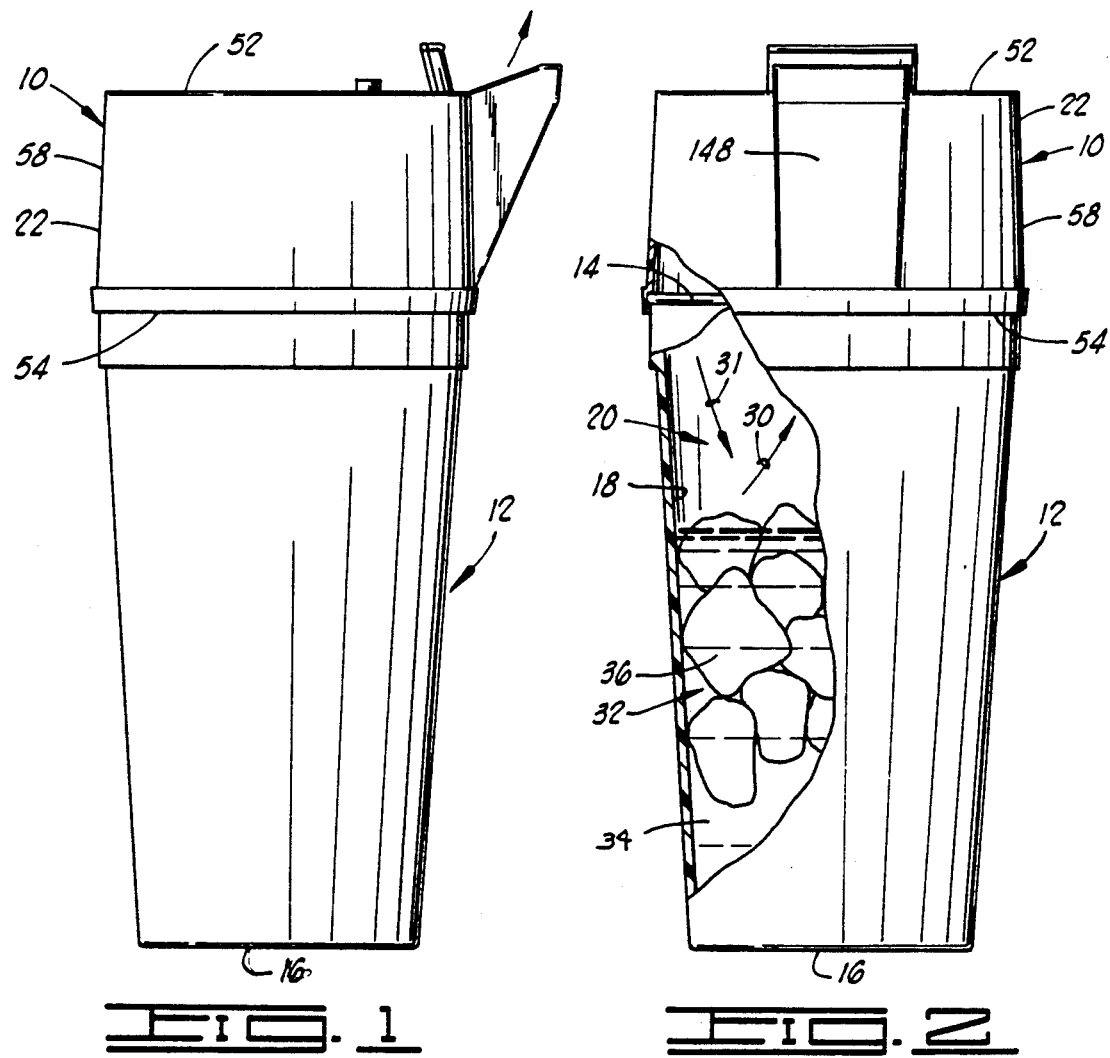
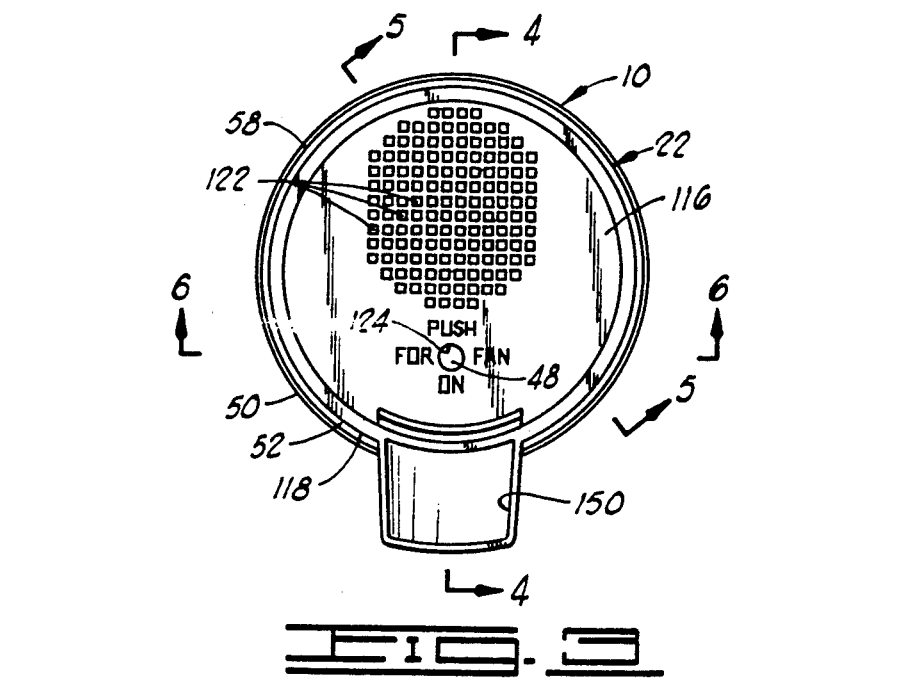

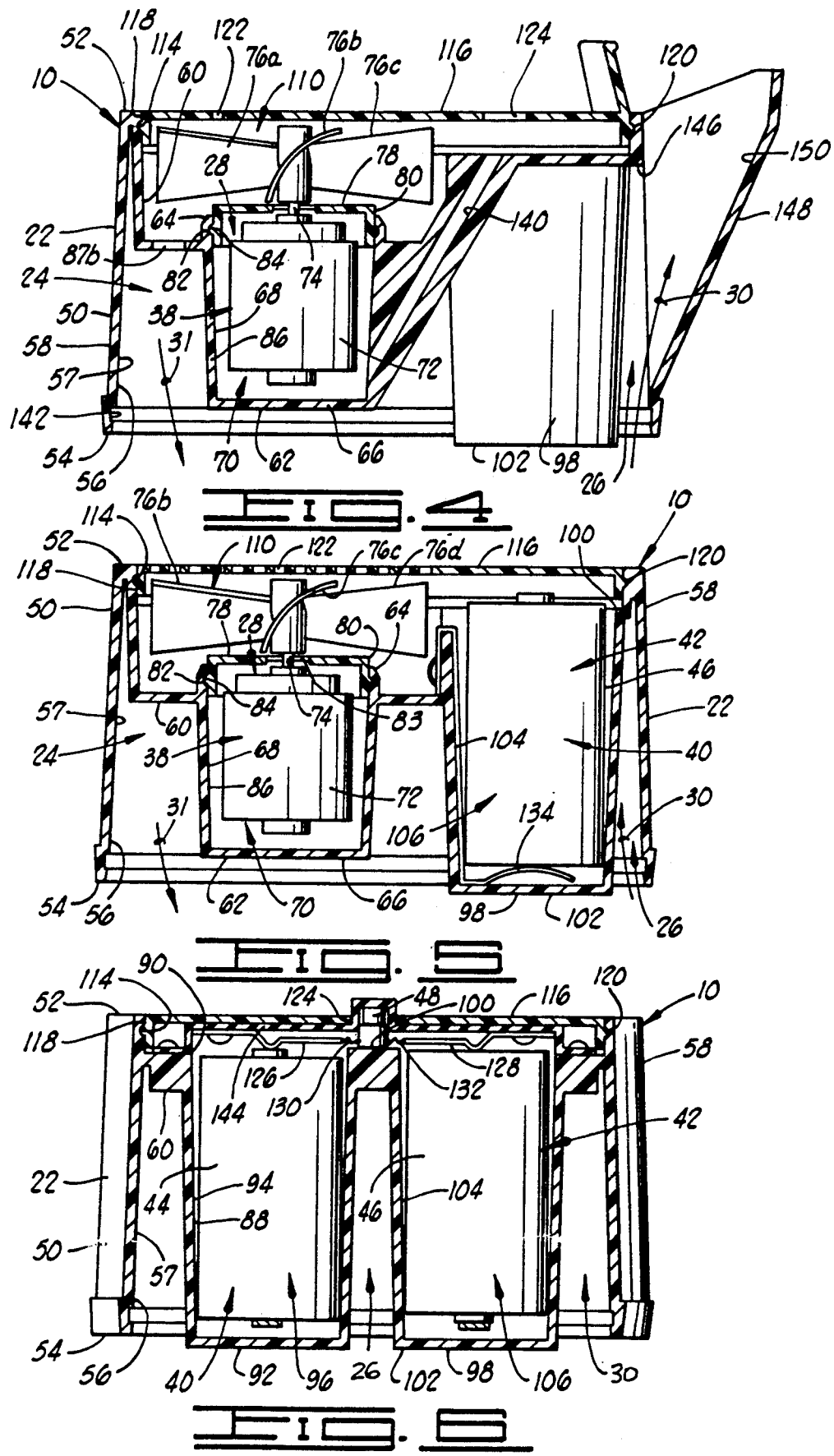

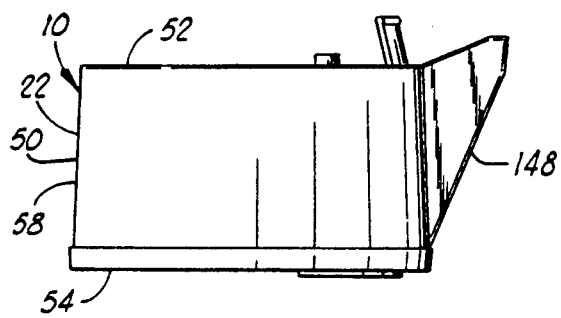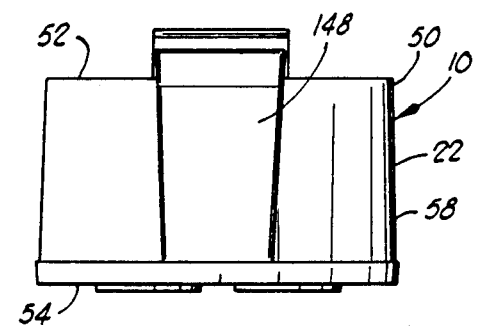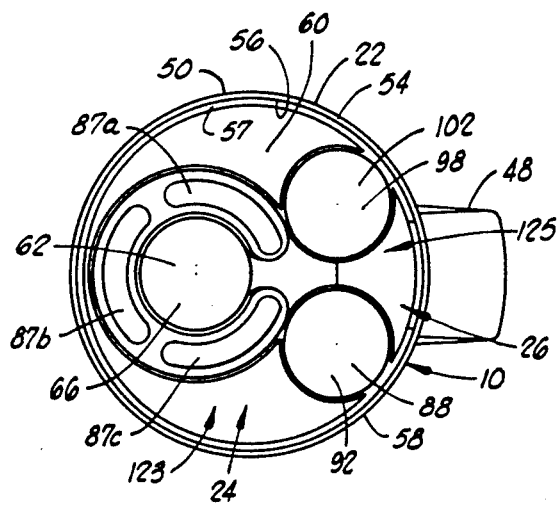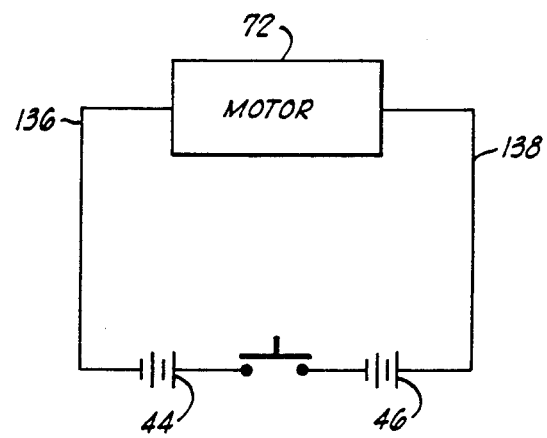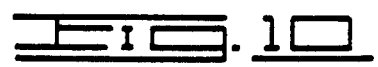

AIR CONDITIONING DEVICE

FIELD OF THE INVENTION

The present invention relates generally to air conditioning devices and, more particularly, but not by way of limitation, to a lid removably connectable to a cup with a blower assembly means for blowing air into the cup and over a substance in the cup for cooling or heating the air to produce an air exit stream and passing the air exit stream from the cup.

BRIEF DESCRIPTION OF THE DRAWINGS

FIG. 1 is a side elevational view showing a air conditioning device constructed in accordance with the present invention connected to the upper end of a cup.

FIG. 2 is a front elevational view of the device of the present invention connected to the cup.

FIG. 3 is a top elevational view of the air conditioning device connected to the cup shown in FIGS. 1 and 2.

FIG. 4 is a sectional view of the air conditioning device of the present invention taken substantially along the lines 4—4 of FIG. 3, but not showing the cup.

FIG. 5 is another sectional view of the air conditioning device of the present invention taken substantially along the lines 5—5 of FIG. 3, but not showing the cup.

FIG. 6 is another sectional view of the air conditioning device of the present invention taken substantially along the lines 6—6 of FIG. 3, but not showing the cup.

FIG. 7 is a side elevational view of the air conditioning device of the present invention.

FIG. 8 is a front view of the air conditioning device of the present invention, rotated 90° with respect to the view shown in FIG. 7.

FIG. 9 is a bottom elevational view of the air conditioning device shown in FIGS. 7 and 8.

FIG. 10 is a schematic view of a portion of the air conditioning device of the present invention.

DESCRIPTION OF THE PREFERRED EMBODIMENTS

Referring to the drawings in general and to FIGS. 1, 2 and 3 in particular, shown therein and designated by the general reference numeral 10 is an air conditioning device which is constructed and operates in accordance with the present invention. The air conditioning device 10 is adapted to be used with a cylindrically shaped cup 12 having an upper end 14 (FIG. 2) and a lower end 16 (FIGS. 1 and 2). The cup 12 has a cup opening 18 (FIG. 2) which extends through the cup 12 and intersects the upper end 14 of the cup 12 forming a cup space 20 (FIG. 2) which essentially is surrounded by the cup 12 except for the opened upper end 14 of the cup 12.

The air conditioning device 10 comprises a lid 22 (FIGS. 1-9). The lid 22 is removably connectable to the upper end of the cup 12, as shown more clearly in FIGS. 1 and 2. The lid 32 has an air entry opening 24 (FIGS. 4, 5, 6 and 9) and an air exit opening 26 (FIGS. 4, 5, 6 and 9). The air entry opening 24 is spaced a distance from the air exit opening 26.

The air conditioning device 10 also includes a blower assembly means 28 (FIGS. 4 and 5). The blower assembly means 28 is connected to the lid 22 with a portion of the blower assembly means 28 being in communication with the air entry opening 24. The blower assembly means 28 is conditionable in an ON and an OFF condition. In the ON condition of the blower assembly means 28, the blower assembly means 28 blows air into and through the air entry opening 24.

The cup 12 is shaped and adapted to hold a substance 32 (FIG. 2) which is disposed in the cup space 20. The substance 32 may be a cool substance comprising a liquid 34 (FIG. 2) and/or ice 36 (FIG. 2) or combinations thereof for example. The substance 32 also may be a hot substance such as hot liquid 34 without the ice 36. When the substance 32 is a cool substance, the substance 32, the liquid has a temperature level below the ambient temperature level. When the substance 32 is a hot substance, the substance 32 has a temperature level above the ambient temperature level. The substance 32 may also be an artificial refreezable ice such as commonly known as "blue ice" without any liquid.

Cups such as the cup 12 just described, are common and well known in the art. For example, such cups might be of the type commonly referred to as "paper cups". Such cups, as contemplated by the cup 12, hold a cool drink such as a soft drink or alcoholic beverage or a hot drink such as coffee or hot chocolate, and an individual generally drinks the cool or hot drink from the cup 12 via the opened upper end 14 thereof. The cup 12 also may be a plastic cup or made out of any other material capable of holding the cool or hot substance 32.

The air conditioning device 10 particularly is adapted to be used with the cup 12 preferably having a cup space 20 sized to accommodate between about 8 ounces and about 32 ounces of liquid 34.

Individuals attend many events, such as a sporting event like football, in relatively hot or warm weather. It is common for such individuals attending such events to order and have available cool substances 32 in cups like the cup 12. Using the present invention, the individual connects the air conditioning device 10 to the upper end 14 of the cup 12 and then the individual conditions the blower assembly 28 in the ON condition. The ON condition of the blower assembly 28, air at ambient temperature level from the air surrounding the cup 12 is pulled or blown through the air entry opening 24 forming an air entry stream 31 (FIGS. 2, 4 and 5). This air entry stream 31 is circulated within the cup space 20 and over the cool substance 32 thereby cooling the air entry stream 31 to provide an air exit stream 30 (FIGS. 2, 4 and 5) having a temperature level below the ambient temperature level and below the temperature level of the air entry stream 31. The air stream exit 31 passes through the air exit opening 26 and from the cup 12. The individual positions the cup 12 with the air conditioning device 10 connected thereto so that the air exit stream 30 is directed to a particular portion of the individual, such as the individual's face or other portion of the individual's body which the individual desires to be cooled via the air exit stream 30.

In those instances where the substance 32 is a hot substance 32, the operation of the air conditioning device 10 is exactly the same as that described before with respect to the cool substance 32, except the hot substance 32 has a temperature level above the ambient temperature level and the hot substance 32 heats the air entry stream 31 to provide an air exit stream 30 having a temperature level above the ambient temperature level and above the temperature level of the air entry stream 31. In this instance, the individual positions the cup 12 to direct the heated air exit stream 30 to a particular portion of the individual's body to pass the heated air exit stream 30 over that portion of the individual's body.

The blower assembly means 28 more particularly comprises a blower 38 (FIGS. 4 and 5) which is connected to the lid 22 and which is in communication with the air entry opening 24. The blower 38 blows air into and through the air entry opening 24 and into the cup space 20 in the ON condition of the blower 38. The blower assembly means 28 also includes a power supply means 40 (FIGS. 5 and 6) for conditioning the blower 38 in the ON condition and in the OFF condition.

The power supply means 40 (FIGS. 5 and 6) more particularly comprises a battery power supply 42 (FIGS. 5 and 6) which is connected to the blower 38. The battery power supply 42 more particularly comprises two C-size batteries 44 (FIGS. 5) and 46 (FIGS. 5 and 6). The batteries 44 and 46 are connected series and a switch 48 (FIGS. 3, 6 and 10) is interposed between the battery supply 42 and the blower 38.

The switch 48 has a closed position and an opened position. The switch 48 provides electrical continuity between the blower 38 and the battery power supply 42 in the closed position of the switch 48 for conditioning the blower 38 in the ON condition. The switch 48 interrupts electrical continuity between the battery power supply 42 and the blower 38 in the opened position of the switch 48 for conditioning the blower 38 in the OFF condition.

The lid 22 comprises a base 50 (FIGS. 3, 4, 5, 6, 7 and 8) having an upper end 52 (FIGS. 1-8) and a lower end 54 (FIGS. 1, 2 and 4-9). The base 50 has a base opening 56 (FIGS. 4, 5, and 6) which extends through the base 50 and intersects the upper end 52 and the lower end 54 of the base 50. The base 50 is generally cylindrically shaped. The base opening 56 extends a distance upwardly through the base 50 and forms an inner peripheral surface 57 (FIGS. 4, 5, 6 and 9) in the base 50. The base 50 also has an outer peripheral surface 58 (FIGS. 1-6) which extends circumferentially about the base 50 and generally between the upper and the lower ends of the base 50.

A component support structure 60 (FIGS. 4, 5, 6 and 9) is connected to the inner peripheral surface 57 of the base 50 generally near the upper end 52 of the base 50. The component support structure 60 encompasses the base opening 56 and substantially closes the base opening 56. The component support structure 60 is disposed between the upper end 52 and the lower end 54 of the base 50 with an outer peripheral wall of the component support structure 68 extending upwardly and being connected to the base 50 generally at the upper end 52 of the base 50. The component support structure 60 divides the base opening 56 into an upper space 110 (FIGS. 4 and 5) extending between the component support structure 60 and the upper end 52 of the base 50 and a lower space 123 (FIG. 9) extending between the component support structure 60 and the lower end 54 of the base 50.

A blower well 62 (FIGS. 4, 5 and 9) is formed in the component support structure 60. The blower well 62 has an upper end 64 (FIGS. 4 and 5) and a lower end 66 (FIGS. 4, 5 and 9). A blower opening 68 (FIGS. 4 and 5) is formed through the blower well 62. The blower opening 68 intersects the upper end of the blower well 62 and extends a distance therethrough generally toward the lower end 66 forming a blower space 70 (FIGS. 4 and 5). The lower end 66 of the blower well 62 is closed. The blower space 70 is sized and shaped to accommodate a portion of the blower 38.

The blower 38 more particularly comprises a blower motor 72 (FIGS. 4 and 5) having a blower shaft 74 (FIGS. 4 and 5) extending a distance from one end of the blower motor 72. The blower motor 72 also is shown in FIG. 10 and designated therein simply by the reference "motor". Blower fan blades 76 are connected to the blower shaft 74. In the particular embodiment of the invention shown in the drawings, the blower 38 more particularly includes four blower fan blades 76 designated in the drawings by the respective reference numerals 76a, 76b, 76c and 76d (FIGS. 4 and 5).

The blower motor 72 is disposed in the blower space 70 with the blower shaft 74 extending a distance generally outwardly and upwardly from the upper end 64 of the blower well 62. A blower cap 78 (FIGS. 4 and 5) is removably connected to the upper end 64 of the blower well 62. The blower shaft 74 more particularly extends through an opening 83 (FIG. 5) a central portion of the blower cap 78 so that the blower fan blades 76 are supported generally above the blower cap 78. The blower cap 78 cooperates to support the blower motor 72 in the blower space 70. In another embodiment, the blower motor 72 may be supported on the end of the blower well 62. The blower well 62 is positioned in the base opening 56 so that the blower fan blades 76 are disposed in a plane generally below the planer disposition of the upper end 52 of the base 50. The blower fan blades 76 are disposed in the upper space 110.

The blower cap 78 includes an outer peripheral surface 80 (FIGS. 4 and 5). A ridge 82 (FIGS. 4 and 5) is formed on the outer peripheral surface 80 and the ridge 82 extends a distance radially outwardly from the outer peripheral surface 80 of the blower cap 78. A recess 84 (FIGS. 4 and 5) is formed in an inner peripheral surface 86 of the blower well 62 with the recess 84 being positioned generally near the upper end 64 of the blower well 62. The blower cap 78 is disposed in the blower opening 68 to a position wherein the rigid 82 snaps into the recess 84 for removably connecting the blower cap 78 to the upper end 64 of the blower well 62. The blower cap 78 sealingly encloses the upper end 64 of the blower well 62. The blower cap 78 prevents any contaminants from the blower motor 72 from exiting the blower wells 62 and passing through the air entry opening 24 and into the cup 12. Further, the blower cap 78 also prevents contaminants from entering the blower well 62 and possibly damaging the blower motor 72.

Openings 87 (FIGS. 4 and 9) are formed in the component support structure 60 generally surrounding the blower well 62. More particularly, three openings 87 are formed through the component support structure 60 with the individual openings being designated in FIG. 10 by the respective reference numerals 87a, 87b and 87c. The openings 87 are spaced circumferentially about the blower well 62.

A first battery well 88 (FIGS. 6 and 9) is connected to or formed on the component support structure 60. The first battery well 88 has an upper end 90 (FIG. 6) and a lower end 92 (FIGS. 6 and 9). A first battery opening 94 (FIG. 6) is formed through the upper end 90 of the first battery well 88. The first battery opening 94 extends a distance through the first battery well 88 forming a first battery space 96 (FIG. 6). The lower end 92 of the first battery well 88 is closed and the upper end 90 of the first battery well 88 is opened. The first battery space 96 is sized to accommodate the first battery 44 and the first battery 44 is disposed in the first battery space 96.

A second battery well 98 (FIGS. 4, 5, 6 and 9) is formed in the component support structure 60. The second battery well 98 has an upper end 100 (FIGS. 5 and 6) and a lower end 102 (FIGS. 4, 5, 6 and 9). A second battery opening 104 (FIGS. 5 and 6) is formed through the upper end 100 of the second battery well 98. The second battery opening 104 extends a distance through the second battery well 98 forming a second battery space 106 (FIGS. 5 and 6). The lower end 102 of the second battery well 98 is closed and the upper end 100 of the second battery well 98 is opened. The second battery space 106 is sized to accommodate the second battery 46 and the second battery 46 is disposed in the second battery space 106.

The first battery 44 is disposed in the first battery well 88 and positioned so that the positive end of the first battery 44 is disposed generally near the upper end 90 of the first battery well 88. The second battery 46 is disposed in the second battery well 98 and positioned so that the negative end of the second battery 46 is disposed generally near the upper end 100 of the second battery well 98.

As mentioned before, the component support structure 60 basically is disposed a distance below the upper end 52 of the base 50 forming the upper open space 110 generally near and spaced a distance from the upper end 52 of the base 50. The upper space 110 is in communication with the first and second battery wells 88 and 98 and in communication with the blower well 62.

A recess 114 is formed in the inner peripheral surface 57 (FIGS. 4 and 5) of the base 50 and the recess 114 extends circumferentially about the inner peripheral surface 57. As shown in FIGS. 4 and 5, a portion of the base opening 56 is stepped generally at the upper end 52 of the base 50 along at least a portion of the circumference of the base 50. A portion of the recess 114 is in this stepped portion of the base opening 56 or more particularly in the stepped portion of the base 50 formed by the base opening 56.

The air conditioning device 10 includes a lid cap 116 (FIGS. 3-6). The lid cap 116 is generally circularly shaped and has an outer peripheral surface 118 (FIGS. 3-6). A rigid 120 (FIGS. 4, 5 and 6) is formed on the outer peripheral surface 118 and the rigid 120 extends circumferentially about the outer peripheral surface 118. The lid cap 116 is disposed in the upper space 110 to a position wherein the rigid 120 is snappingly disposed in the recess 114 thereby removably connecting the lid cap 116 to the upper end 52 of the base 50. The lid cap 116 substantially encompasses and closes the upper space 110.

A plurality of air openings 122 (FIGS. 3, 4 and 5) are formed through the lid cap 116, with only one of the air openings 122 being designated by a reference numeral in the drawings. The air openings 122 are positioned on the lid cap 116 so that, when the lid cap 116 is connected to the base 50, the air openings 122 are positioned generally above the blower fan blades 76.

A switch opening 124 (FIGS. 3 and 6) is formed through the lid cap 116. A portion of the switch 48 is disposed through the switch opening 124.

A strip of electrically conductive metal 126 (FIGS. 6) is positioned generally over the first battery well 88. The strip of metal 126 is shaped to contact the positive end of the first battery 44.

Another strip of metal 128 (FIG. 6) is positioned over the second battery well 98. The strip of metal 128 is shaped and positioned to contact the negative end of the second battery 46.

One end of the strip of metal 126 is connected to the switch 48 via a conductor 130 (FIG. 6). One end of the strip of metal 128 is connected to the switch 48 via a conductor 132 (FIG. 6).

The switch 128 more particularly is a push button type, ON-OFF switch adapted so that, when the switch 48 is depressed, electrical continuity is established between the conductors 130 and 132 and so that, when the switch is depressed again, electrical continuity is interrupted between the conductors 130 and 132.

A strip of metal 134 (FIG. 5) is disposed in the first battery well 88. The strip of metal 134 is positioned so that one end of the strip of metal 134 contacts the negative end of the first battery 44. The opposite end of the strip of metal 134 extends outwardly from the first battery well 88.

A strip of metal (not shown) similar to the strip of metal 134, is positioned in the second battery well 98 and positioned so that a portion of this strip of metal contacts the positive end of the second battery 46. The two strips of metal including the strip of metal 134 are connected to the blower motor 72 via conductors 136 (FIG. 10) and 138 (FIG. 10).

A conductor opening 140 is formed through the component support structure 60. One end of the conductor opening 140 intersects the blower well 62 and the opposite end of the conductor opening 140 (FIG. 4) is disposed near the first and the second battery wells 88 and 98. The conductors 136 and 138 extend from the first and the second batteries 44 and 46 or more particularly from the strips of metal connected to the first and the second batteries 44 and 46 (including the strip of metal 134) through the conductor opening 140 and the conductors 136 and 138 then are extended through the blower well 62 and are connected to the blower motor 72.

A cup recess 142 (FIG. 4) is formed in the inner peripheral surface 57 of the base 50. The cup recess 142 extends circumferentially about the inner peripheral surface 57 of the base 50. The cup recess 142 is sized to receive the upper end 14 of the cup 12 so the air conditioning device 10 can be snapped onto and removably connected to the cup 12.

An elastomeric seal member 144 (FIG. 6) is connected to the component support structure 60. The elastomeric seal member 144 extends generally over the first and second battery wells 88 and 98.

The switch 48 may extend through an opening in the seal member 144 and into the switch opening 124 in the lid cap 116, although the switch 48 as shown in the drawing is disposed under a portion of the seal member 144. The seal member 144 sealingly encloses the first and the second battery wells 88 and 98 to prevent any contaminant from passing from the first and the second batteries 44 and 46 through the air entry opening 24 and into the cup 12.

An opening 146 (FIG. 4) is formed in the outer peripheral surface 58 of the base 50 and a spout 148 (FIGS. 2, 4, 7, 8 and 9) is connected to the outer peripheral surface 58 of the base 50. The spout 148 extends radially outwardly and upwardly from the base 50. A spout opening 150 (FIGS. 3 and 4) is formed through the spout 148 with the spout opening 150 being in communication with the base opening 56 via the opening 146 in the base 50.

The battery wells 88 and 98 separate the lower space 123 into two separate spaces forming an air exit space 125 (FIG. 9). The spout opening 150, the opening 146, and the air exit space 125 comprise the air exit opening 26. The air openings 122, the upper space 110, the openings 87 and a portion of the lower space 123 comprise the air entry opening 24.

To assemble the air conditioning device 10, the lid cap 116 is snappingly removed from the base 50 and the blower cap 78 is removed from the blower well 62. The seal member 144 then is removed from over the first and the second battery wells 88 and 98 along with the strips of metal 126 and 128 connected to the seal member 144.

The blower shaft 74 is disposed through the opening 83 and the blower fan blades 76 are secured to the blower shaft 74 thereby securing the blower 38 to the blower cap 78. The blower cap 78 along with the blower 38 connected thereto is disposed over the blower well 62 and the blower 38 along with the blower cap 78 are lowered to a position wherein the blower cap 78 is snappingly connected to the blower well 62 thereby disposing the blower motor 72 generally within the blower space 70. Prior to connecting the blower cap 78 and the blower 38 to the blower well 62, the conductors 136 and 138 are connected to the blower motor 72.

The batteries 44 and 46 then are disposed in the respective battery wells 88 and 98. The seal member 144 along with the strips of metal 126 and 128 then are positioned over the battery wells 88 and 98 and the seal member 144 is connected to the component support structure 60 via a fastener such as screws (FIG. 6). Prior to connecting the seal member 144 to the component support structure 60, the switch 48 is positioned below the seal member 144 and the conductors 136 and 138 are connected to the strips of metal 126 and 128. The lid cap 116 then is snappingly connected to the upper end 52 of the base 50.

When the individual desires to use the air conditioning device 10, the individual snappingly snaps the lower end 54 of the base 50 to the upper end 14 of the cup 12, with the upper end 14 of the cup 12 being snapped into the recess 142 in the base 50. The individual then places the switch 48 in the closed position for establishing electrical continuity between the batteries 44 and 46 and the blower motor 72. In this position, the blower motor 72 is condition in the ON condition and rotatingly drives the blower fan blades 76. As the blower fan blades 76 are rotatingly driven, air near the lid cap 116 at ambient temperature level is pulled through the air openings 122, passed through the upper space 110, through the openings 87 and through the lower space 123 and passed into the cup space 20. The air is passed from the air entry opening 24 into the cup space 20 and over the substance 32 disposed in the cup space 20 where the air is cooled or heated to a temperature level below or above ambient temperature depending on whether the substance 32 is a cool substances 22 or a hot substance 32 to provide the air exit stream 30. The air exit stream 30 is passed from the cup space through the air exit opening 26 for cooling or heating a portion of the individual.

Changes may be made in the construction and the operation of the various components, elements and assemblies described herein and without departing from the spirit and scope of the invention as defined in the following claims.

What is claimed is:

1. An air conditioning device adapted to be used with a cup having an upper end, a lower end and a cup opening intersecting the upper end extending a distance therethrough forming a cup space and a air conditioning substance disposed in the cup space, the air conditioning device comprising:

a lid removably connectable to the upper end of the cup and having an air entry opening and an air exit opening, the air entry opening being spaced a distance from the air exit opening; and blower assembly means connected to the lid with a portion of the blower assembly means being in communication with the air entry opening and being conditionable in an ON and an OFF condition for blowing air into the air entry opening in an ON condition of the blower assembly means providing an air entry stream, the air entry stream passing through the air entry opening and into the cup space and the air passing over the substance and providing an air exit stream and the air exit stream passing through the cup space and through the air exit opening.

2. The air conditioning device of claim 1 wherein the blower assembly means is defined further to comprise:

a blower connected to the lid and being in communication with the air entry opening, the blower blowing the air entry stream into and through the air entry opening and into the cup space in the ON condition of the blower; and means for conditioning the blower in the ON condition and in the OFF condition.

3. The air conditioning device of claim 2 wherein the means for conditioning the blower in the ON condition and the OFF condition further comprises:

a battery power supply connected to the blower; and a switch interposed between the battery power supply and the blower, the switch having a closed position and an opened position, the switch providing electrical continuity between the blower and the battery power supply in the closed position of the switch for conditioning the blower in the ON condition and the switch interrupting electrical continuity between the battery power supply and the blower in the opened position of the switch for conditioning the blower in an OFF condition.

4. The air conditioning device of claim 1 wherein the cup is defined further as having a cup space sized to accommodate between about 8 ounces and about 32 ounces of substance.

5. The air conditioning device of claim 1 wherein the cup is about cylindrically shaped having an outer periphery, and wherein the lid is defined further as being about cylindrically shaped and comprising means extending about the outer periphery of the lid for removably connecting the lid to the upper end of the cup.

6. The air conditioning device of claim 1 wherein the liquid is defined further to comprise:

a base having an upper end and a lower end with a base opening being formed through the base intersecting the upper and the lower end and forming an inner peripheral surface;

a component support structure connected to the inner peripheral surface of the base and being disposed generally in the base opening and positioned between the upper and the lower end of the base forming an upper space between the component supports structure and the upper end of the base and a lower space between the component support structure and the lower end of the base, the blower assembly means being supported on the component supports structure.

7. The air conditioning device of claim 6 wherein the blower assembly means is defined further to comprise:
a blower supported on the component support structure and being in communication with the air entry opening, the blower blowing air into the air entry opening and into the cup space in the ON condition of the blower; and
a battery supported on the component support structure, the battery being connected to the blower; and
a switch interposed between the battery and the blower, the switch having a closed position and an opened position, the switch providing electrical continuity between the blower and the battery in the closed position of the switch for conditioning the blower in the ON condition and the switch interrupting electrical continuity between the battery and the blower in the opened position of the switch for conditioning the blower in an OFF condition.

8. The air conditioning device of claim 7 wherein the blower further comprises:
a blower motor with a blower shaft extending from one end thereof and fan blades connected to the blower shaft, and wherein the air conditioning device further comprises:
a blower well having an upper end and a lower end with a blower opening extending through the upper end thereof a distance toward the lower end thereof forming a blower space therein, the blower motor being disposed generally in the blower space of the blower well with the blower shaft extending outwardly from the upper end of the blower well and the blower fan blades being disposed generally above the upper end of the blower well generally in the upper space of the base;
a battery well having an upper end and a lower end with a battery opening extending through the upper end thereof a distance toward the lower end thereof forming a battery space therein, the battery being disposed in the battery well and the battery well being connected to the component support structure near the upper end of the battery well.

9. The air conditioning device of claim 8 further comprising:
a blower cap removably connected to the upper end of the blower well for substantially closing the blower opening at the upper end of the blower well, the shaft extending through the blower cap and the blower fan blades being disposed generally above the blower cap and in the upper space in the base.

10. The air conditioning device of claim 9 further comprising:
means for sealingly enclosing the upper end of the battery well.

11. The air conditioning device of claim 8 wherein the components supports structure comprises an opening disposed near the blower well, and wherein the air conditioning device further comprising:
a lid cap removably connected to the base near the upper end of the base, the lid cap enclosing the base opening at the upper end of the base, a plurality of air openings being formed through the lid cap and the air openings being positioned about above the blower fan blades, the air openings, a portion of the upper space in the base, the opening in the component support structure near the blower well and a portion of the lower space in the base comprising the air entry opening.

12. The air conditioning device of claim 11 wherein a portion of the switch extends through a switch opening in the lid cap.

13. The air conditioning device of claim 11 further comprising an opening formed through the base in communication with the base opening; and
a spout having a spout opening extending therethrough, the spout being connected to the base near the opening in the base with the spout opening being in communication with the base opening via the opening in the base, the spout opening, the opening in the base and a portion of the lower space defining the air exit opening.

14. An air conditioning device, comprising:
a cup having an upper end, a lower end and a cup opening intersecting the upper end and extending a distance therethrough forming a cup space with a substance being disposable in the cup space;
a lid removably connectable to the upper end of the cup and having an air entry opening and an air exit opening, the air entry opening being spaced a distance from the air exit opening; and
blower assembly means connected to the lid with a portion of the blower assembly means being in communication with the air entry opening and being conditionable in an ON and an OFF condition for blowing air into the air entry opening in an ON condition of the blower means, the air passing through the air entry opening and into the cup space and the air passing over the cool substance and being cooled to provide cool air stream and the cool air stream passing through the cup space and through the air exit opening.

15. The air conditioning device of claim 14 wherein the blower assembly means is defined further to comprise:
a blower connected to the lid and being in communication with the air entry opening, the blower blowing the air entry stream into and through the air entry opening and into the cup space in the ON condition of the blower; and
means for conditioning the blower in the ON condition and in the OFF condition.

16. The air conditioning device of claim 15 wherein the means for conditioning the blower in the ON condition and the OFF condition further comprises:
a battery power supply connected to the blower; and
a switch interposed between the battery power supply and the blower, the switch having a closed position and an opened position, the switch providing electrical continuity between the blower and the battery power supply in the closed position of the switch for conditioning the blower in the ON condition and the switch interrupting electrical continuity between the battery power supply and the blower in the opened position of the switch for conditioning the blower in an OFF condition.

17. The air conditioning device of claim 14 wherein the cup is defined further as having a cup space sized to accommodate between about 8 ounces and about 32 ounces of substance.

18. The air conditioning device of claim 14 wherein the cup is about cylindrically shaped having an outer periphery, and wherein the lid is defined further as being about cylindrically shaped and comprising means extending about the outer periphery of the lid for removably connecting the lid to the upper end of the cup 19. The air conditioning device of claim 14 wherein the liquid is defined further to comprise:
   a base having an upper end and a lower end with a base opening being formed through the base intersecting the upper and the lower end and forming an inner peripheral surface;
   a component support structure connected to the inner peripheral surface of the base and being disposed generally in the base opening and positioned between the upper and the lower end of the base forming an upper space between the component supports structure and the upper end of the base and a lower space between the component support structure and the lower end of the base, the blower assembly means being supported on the component supports structure.

20. The air conditioning device of claim 18 wherein the blower assembly means is defined further to comprise:
   a blower supported on the component support structure and being in communication with the air entry opening, the blower blowing air into the air entry opening and into the cup space in the ON condition of the blower; and
   a battery supported on the component support structure, the battery being connected to the blower; and
   a switch interposed between the battery and the blower, the switch having a closed position and an opened position, the switch providing electrical continuity between the blower and the battery in the closed position of the switch for conditioning the blower in the ON condition and the switch interrupting electrical continuity between the battery and the blower in the opened position of the switch for conditioning the blower in an OFF condition.

21. The air conditioning device of claim 19 wherein the blower further comprises:
   a blower motor with a blower shaft extending from one end thereof and fan blades connected to the blower shaft, and wherein the air conditioning device further comprises:
   a blower well having an upper end and a lower end with a blower opening extending through the upper end thereof a distance toward the lower end thereof forming a blower space therein, the blower motor being disposed generally in the blower space of the blower well with the blower shaft extending outwardly from the upper end of the blower well and the blower fan blades being disposed generally above the upper end of the blower well generally in the upper space of the base;
   a battery well having an upper end and a lower end with a battery opening extending through the upper end thereof a distance toward the lower end thereof forming a battery space therein, the battery being disposed in the battery well and the battery well being connected to the component support structure near the upper end of the battery well.

22. The air conditioning device of claim 20 further comprising:
   a blower cap removably connected to the upper end of the blower well for substantially closing the blower opening at the upper end of the blower well, the shaft extending through the blower cap and the blower fan blades being disposed generally above the blower cap and in the upper space in the base.

23. The air conditioning device of claim 21 further comprising:
   means for sealingly enclosing the upper end of the battery well.

24. The air conditioning device of claim 20 wherein the components supports structure comprises an opening disposed near the blower well, and wherein the air conditioning device further comprising:
   a lid cap removably connected to the base near the upper end of the base, the lid cap enclosing the base opening at the upper end of the base, a plurality of air openings being formed through the lid cap and the air openings being positioned about above the blower fan blades, the air openings, a portion of the upper space in the base, the opening in the component support structure near the blower well and a portion of the lower space in the base comprising the air entry opening.

25. The air conditioning device of claim 23 wherein a portion of the switch extends through a switch opening in the lid cap.

26. The air conditioning device of claim 23 further comprising an opening formed through the base in communication with the base opening; and
   a spout having a spout opening extending therethrough, the spout being connected to the base near the opening in the base with the spout opening being in communication with the base opening via the opening in the base, the spout opening, the opening in the base and a portion of the lower space defining the air exit opening.

* * * * *

UNITED STATES PATENT AND TRADEMARK OFFICE
CERTIFICATE OF CORRECTION

PATENT NO. : 5,062,281

DATED : November 5, 1991

INVENTOR(S) : Samuel C. Oliphant

It is certified that error appears in the above-identified patent and that said Letters Patent is hereby corrected as shown below:

On the Title page,

In the abstract, the first word "A" should be --An--.

Column 7, line 48, the word "condition" should be --conditioned--.

Column 7, line 59, the words "cool substances 22" should be --cool substance 32--.

Column 8, line 5, the words "a air" should be --an air--.

Signed and Sealed this

Twenty-fifth Day of May, 1993

*Attest:*

MICHAEL K. KIRK

*Attesting Officer*  Acting Commissioner of Patents and Trademarks